No. 676,480. Patented June 18, 1901.
O. WIESE.
SPRING SCALE.
(Application filed Feb. 15, 1900.)

(No Model.) 2 Sheets—Sheet 1.

WITNESSES:

INVENTOR
Otto Wiese
BY
ATTORNEYS

No. 676,480. Patented June 18, 1901.
O. WIESE.
SPRING SCALE.
(Application filed Feb. 15, 1900.)
(No Model.) 2 Sheets—Sheet 2.
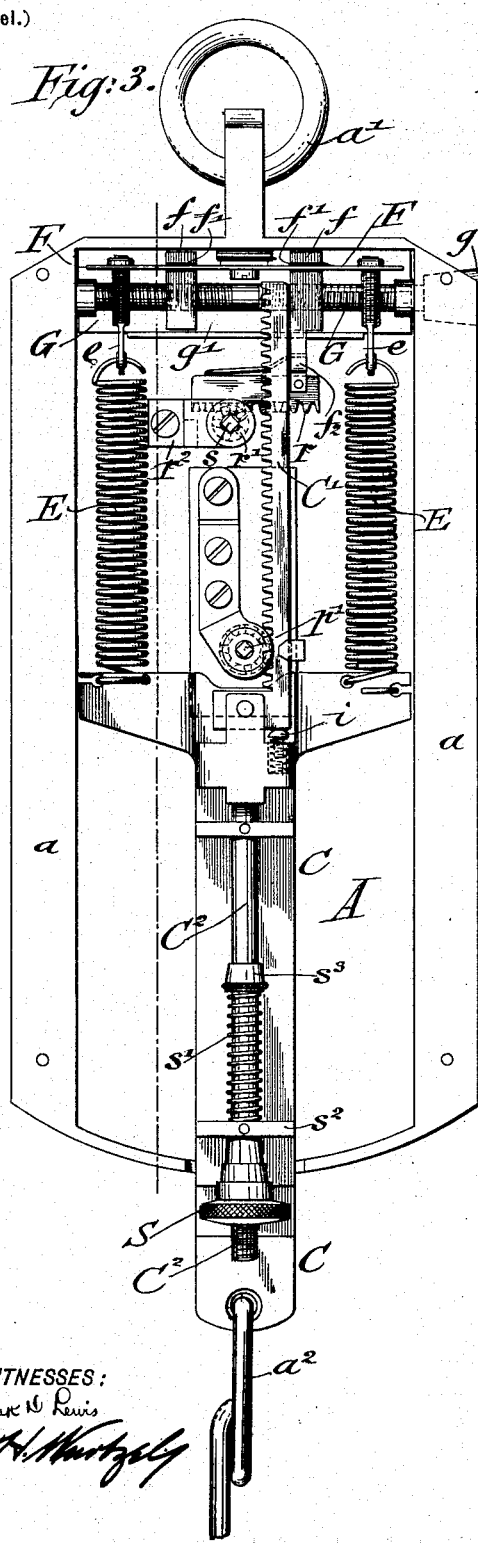
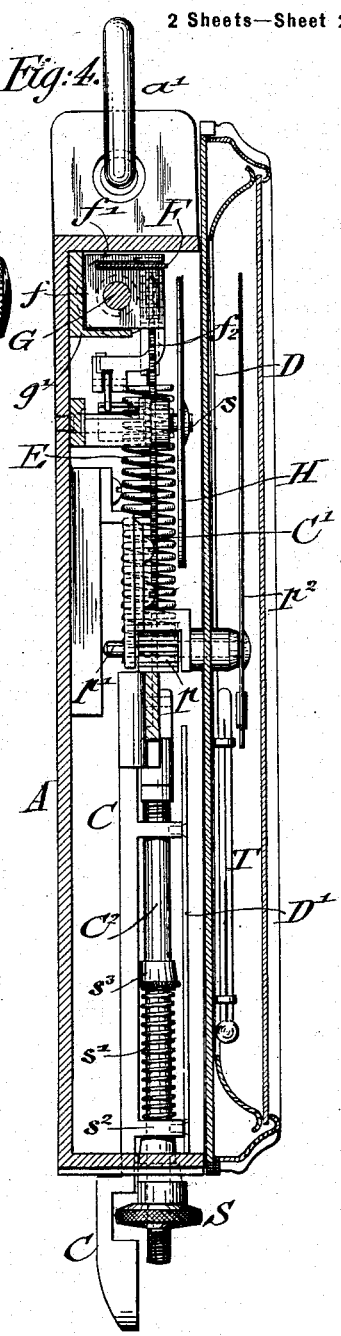
WITNESSES:
INVENTOR
Otto Wiese
BY
ATTORNEYS

UNITED STATES PATENT OFFICE.

OTTO WIESE, OF NEW YORK, N. Y., ASSIGNOR TO THE COMPUTING SCALE COMPANY, OF DAYTON, OHIO.

SPRING-SCALE.

SPECIFICATION forming part of Letters Patent No. 676,480, dated June 18, 1901.

Application filed February 15, 1900. Serial No. 5,325. (No model.)

*To all whom it may concern:*

Be it known that I, OTTO WIESE, a citizen of the Empire of Germany, residing in New York, in the borough of Manhattan and State of New York, have invented certain new and useful Improvements in Spring-Scales, of which the following is a specification.

A serious objection heretofore experienced in the practical use of spring-scales of the well-known type is that they do not weigh uniformly and accurately at all temperatures. The flexibility and length of the springs used vary with variations in the temperature, and this impairs the correctness of the result when weighing at other than normal temperature. In cold weather the counterbalancing-springs employed contract and will not be flexed by a given load to the same degree that they would be flexed by the same load in hot weather.

The object of this invention is to provide means whereby the influence of temperature on the counterbalancing-springs, as made manifest by the indicating mechanism of the scales, may be neutralized and a more accurate weighing action secured.

The invention consists of a spring-balance scale having the usual runner, suspension-hook, and counterbalancing-springs, with continuations of said counterbalancing-springs connected with the fixed support and movable supports interposed between the fixed support and said continuations, with means for adjusting said movable supports to regulate the flexure of the springs under load in accordance with the prevailing temperature.

The invention consists, further, in certain novel details of construction and combinations and arrangements of parts, which will be fully described hereinafter and finally pointed out in the claims.

Figure 1:
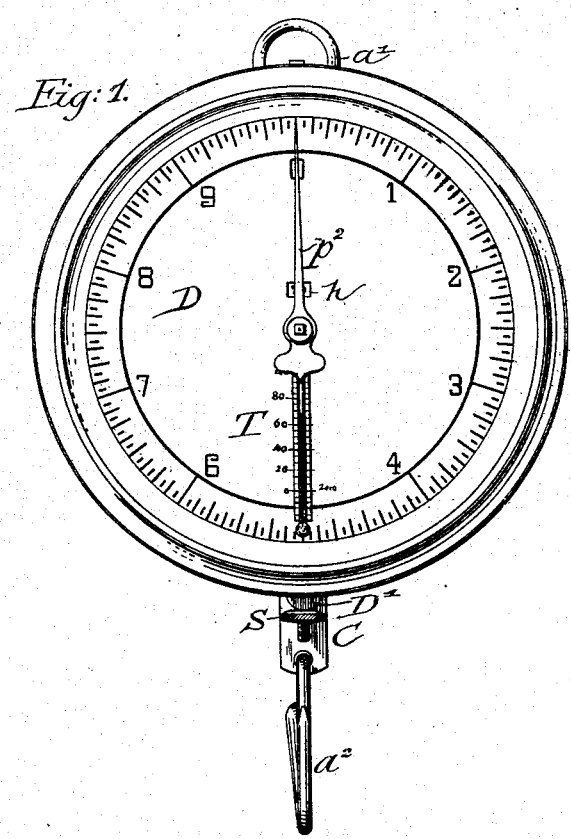
Figure 2:
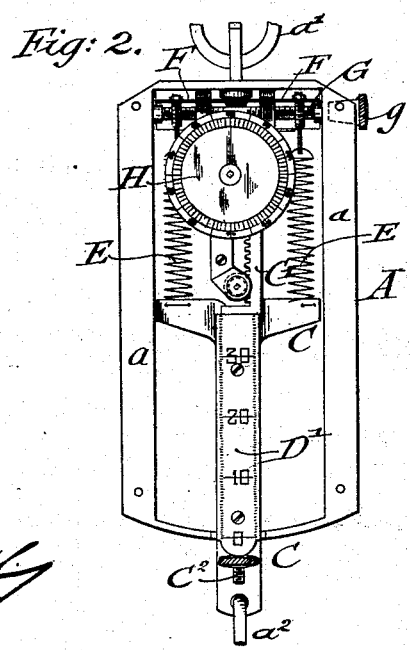

In the accompanying drawings, Figure 1 represents a front elevation of my improved spring-scale. Fig. 2 is a front elevation of the same with the dial removed, showing the interior mechanism. Fig. 3 is a view similar to Fig. 2, but on a larger scale and with certain parts removed; and Fig. 4 is a vertical transverse section on line 4 4, Fig. 3.

Similar letters of reference indicate corresponding parts.

Referring to the drawings, A represents the oblong casing of my improved spring-scale, which is made of suitable cast or sheet metal or other suitable material and provided with flanges $a$ at its sides for attaching the dial D thereto and at its upper end with a suspension-ring $a'$. The hook $a^2$, from which the pan or article to be weighed is suspended, is applied to the lower end of a T-shaped slide-piece or runner C, which is guided in a recess at the lower end of the casing and to the upper ends of which are applied the lower ends of the counterbalancing-springs E. The fixed support for the counterbalancing-springs is the casing, the connection being preferably made at the center through intermediate substantially horizontal extensions of the counterbalancing-springs, adapted to be flexed by the load, but preferably in the form of a flat spring F, centrally connected with the casing, and to which the upper portions of the springs E are loosely connected by adjustable suspension-pins $e$. The extensions F of the counterbalancing-springs may be conveniently termed "regulating-springs," and they are extended horizontally and made flat in order to provide for a more convenient form of adjustable supporting mechanism, whereby the flexure of the springs under load may be varied in accordance with the prevailing temperature. The adjustable supports are formed by slide-blocks $ff$, underlying the arms of the regulating-spring F and through the interiorly-threaded openings in the lower part of which passes an adjusting compound screw-spindle G, which is journaled in the casing and at the outside of the same is provided at one end with a means whereby it may be turned, preferably consisting of an operating button or knob $g$. The blocks $ff$ slide upon a supporting-bracket $g'$, secured to the casing, and support in their recesses $f'$ the regulating-spring F. One of the blocks is provided with a downwardly-extending arm $f^2$, which is pivotally connected with a spring-pressed rack-bar $r$, that meshes with a pinion $r'$, the shaft $s$ of which turns in suitable bearings of the casing and of a bracket $r^2$, attached thereto. To the squared end of the shaft is applied a graduated disk H, which is preferably divided at its circumference into one hundred degrees. The blocks $ff$ are adjusted by turning the screw-spindle G, the disk being thereby also turned in one direction or the other. A thermometer T is arranged, preferably, on the dial of the spring-scale or in any other convenient location for indicating the temperature. After the temperature has been noted the screw-spindle is turned by its knob until the number on the disk H corresponding to the temperature appears in the opening $h$, provided in the dial for this purpose. Simultaneously with the adjustment of the disk to the number corresponding with the degree of temperature the blocks are shifted and the length of the springs adjusted, whereby they will flex under the load to the proper degree in accordance with the prevailing temperature. For adjusting the springs to lower temperatures the blocks are moved toward each other, so that the spring will be more flexible. In warm weather the blocks are moved away from each other, so that a smaller length of the spring extends beyond each slide-block $f$, whereby the spring is rendered less flexible.

From the foregoing it will be seen that by adjusting the length of the spring projecting beyond its support the degree of flexure under load may be varied to overcome variation due to change in temperature, and the scales may be set by the user to weigh correctly at any desired temperature.

It will be noted that there is no bodily adjustment of the counterbalancing-springs, as that would cause the indicator to move away from its zero-point when no load was on the runner and would defeat the objects of the present invention.

The T-shaped slide-piece C is connected by a rack-bar C' with a pinion $p$, to the shaft $p'$ to which the pointer $p^2$ is applied, which passes over the dial and indicates thereby the weight of the article suspended from the hook $a^3$. The rack-bar is pivoted to a longitudinal rod $C^2$. The rod is guided in lugs of the T-shaped slide-piece C and adjustable against the tension of a helical spring $s'$, that is interposed between the lug $s^2$ on the slide-piece C and collar $s^3$, applied to the same by means of a screw-nut S, which is applied to the lower threaded end of the longitudinal rod $C^2$. This permits the accurate adjustment of the pointer to "0." To the lugs of the T-shaped slide-piece C is applied a supplementary graduated plate D', which is provided with graduations from "0" to "30." The graduations are so arranged that "0" on the plate is in line with the lower part of the casing when the pointer $p^2$ is at "0" on the dial and no load is on the scale. This plate D' serves, in connection with the dial, for indicating the full weight after the pointer has passed more than once around the dial of the spring-scale.

Having thus described my invention, what I claim as new, and desire to secure by Letters Patent, is—

1. In spring-balance scales, the combination with the frame and runner, of counterbalancing-springs for the runner and load said springs being connected with the frame and adjustable supports interposed between the frame and springs whereby the length of spring subjected to flexure when loaded may be varied to compensate for variations due to change in temperature; substantially as described.

2. In spring-balance scales, the combination with the frame and runner, of counterbalancing-springs connected with the frame, supports adjustable along said springs to vary the length of spring subject to flexure without moving the springs bodily, and means for simultaneously adjusting said supports; substantially as described.

3. In spring-balance scales, the combination with the frame and runner, of pendulous counterbalancing-springs having substantially horizontal end continuations and horizontally-adjustable supports coöperating with said continuations to vary the length of spring exposed for flexure under the influence of load; substantially as described.

4. In spring-balance scales, the combination with the frame and runner, of pendulous counterbalance-springs having substantially horizontal end continuations interposed between their upper ends and the frame, and means for varying the flexibility of said substantially horizontal end continuations; substantially as described.

5. In spring-balance scales, the combination with the frame and runner, of pendulous counterbalance-springs having substantially horizontal end continuations interposed between their upper ends and the frame, and supports for said substantially horizontal continuations adjustable lengthwise thereof to vary the length of end exposed for flexure when load is applied; substantially as described.

6. In spring-balance scales, the combination with the frame and runner, of pendulous counterbalance-springs, substantially horizontal end continuations thereof loosely connected with said pendulous springs and interposed between said springs and the frame, and means for varying the flexibility of said substantially horizontal continuations; substantially as described.

7. In spring-balance scales, the combination with the frame and runner, of pendulous counterbalance-springs, substantially horizontal end continuations thereof loosely and adjustably connected with said pendulous springs and interposed between said springs and the frame, and means for varying the flexibility of said substantially horizontal continuations; substantially as described.

8. In spring-balance scales, the combination with the frame and runner, of pendulous counterbalance-springs, substantially horizontal end continuations thereof, horizontally-adjustable supports for said continuations to vary the length exposed for flexure and a single operating mechanism for said supports whereby they may be simultaneously adjusted; substantially as described.

9. In spring-balance scales, the combination with the frame and runner, of pendulous counterbalance-springs substantially horizontal end continuations thereof, horizontally-adjustable supports for said continuations to vary the length exposed for flexure and an indicator for indicating the adjustment of the supports; substantially as described.

In testimony that I claim the foregoing as my invention I have signed my name in presence of two subscribing witnesses.

OTTO WIESE.

Witnesses:
PAUL GOEPEL,
M. H. WURTZEL.